Aug. 13, 1957   J. C. CANTLEY   2,802,225
TRIMMING MACHINES
Filed Feb. 20, 1956   6 Sheets-Sheet 1

Inventor
Joseph C. Cantley
By his Attorney

Aug. 13, 1957 J. C. CANTLEY 2,802,225
TRIMMING MACHINES
Filed Feb. 20, 1956 6 Sheets-Sheet 2

Inventor
Joseph C. Cantley
By his Attorney

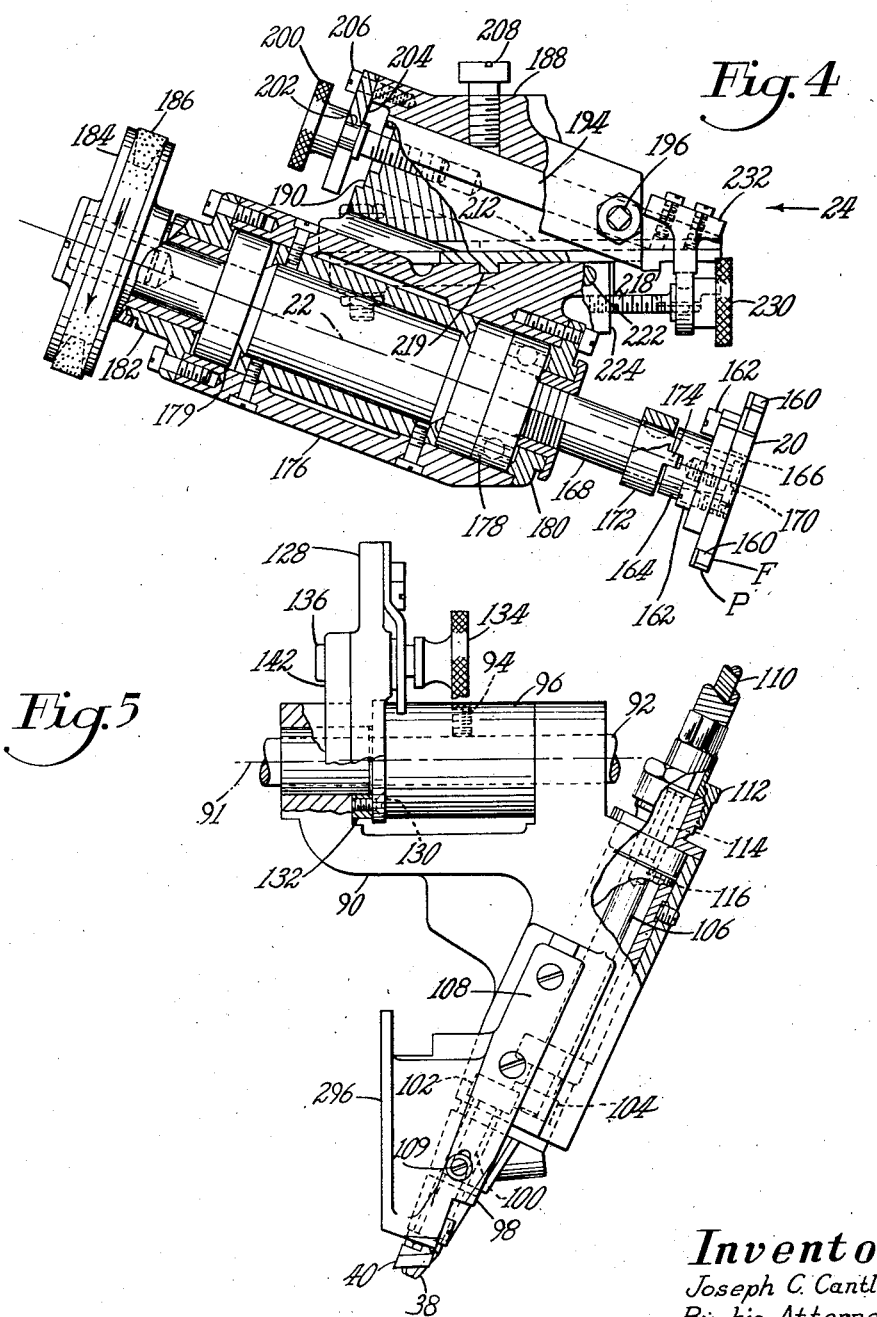

Aug. 13, 1957

J. C. CANTLEY 2,802,225

TRIMMING MACHINES

Filed Feb. 20, 1956

*Inventor*
Joseph C. Cantley
By his Attorney

Aug. 13, 1957 J. C. CANTLEY 2,802,225
TRIMMING MACHINES
Filed Feb. 20, 1956 6 Sheets-Sheet 5
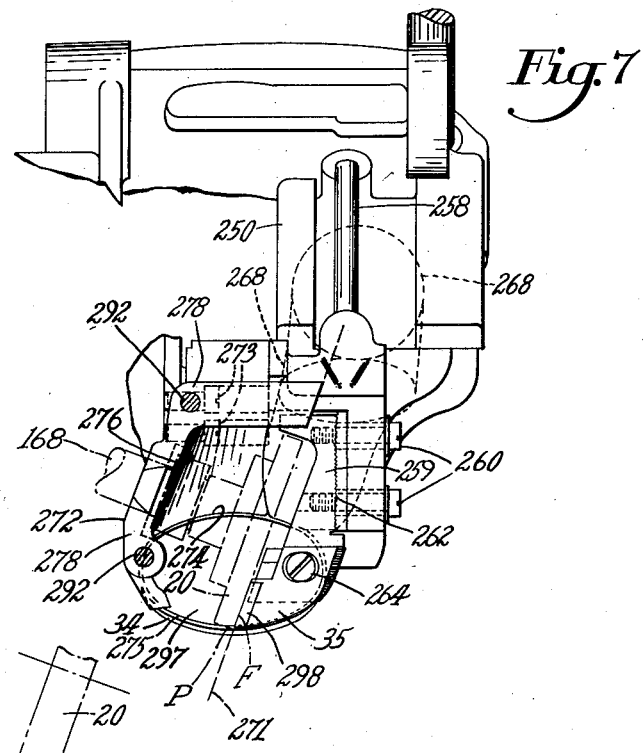
Fig. 7
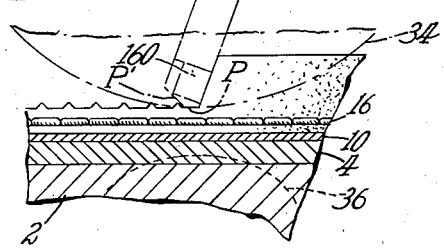
Fig. 10
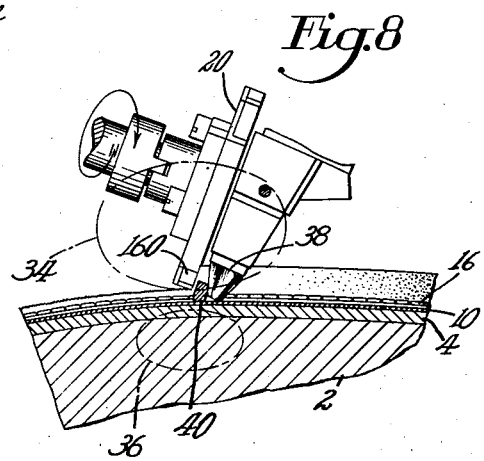
Fig. 8
Fig. 9
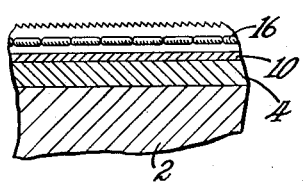
Inventor
Joseph C. Cantley
By his Attorney Aug. 13, 1957  J. C. CANTLEY  2,802,225
TRIMMING MACHINES
Filed Feb. 20, 1956  6 Sheets-Sheet 6

Inventor
Joseph C. Cantley
By his Attorney

United States Patent Office 2,802,225
Patented Aug. 13, 1957

2,802,225

TRIMMING MACHINES

Joseph C. Cantley, Beverly, Mass., assignor to United Shoe Machinery Corporation, Flemington, N. J., a corporation of New Jersey Application February 20, 1956, Serial No. 566,700

7 Claims. (Cl. 12—4.3)

This invention relates to machines for performing trimming operations on shoe bottoms and more particularly to machines for trimming the inseams of partially fabricated welt shoes. A machine of this type is disclosed in United States Letters Patent No. 1,226,872, granted May 22, 1917, to Andrew Eppler. It is to be understood, however, that in certain aspects thereof, the invention is not limited to inseam trimming machines but is applicable generally to trimming machines which operate progressively about the shoe bottom to remove excess material therefrom.

The patent to Eppler discloses an inseam trimming machine in which surplus portions of the inseam are severed by a cup-shaped trimming knife which cuts the inseam material into long thin strips comprising upper leather, insole rib material, canvas reinforcing material and a tar-like substance from the box toe or stiffening material, etc. It has been found difficult efficiently to remove these long strips mechanically from within the cup of the knife and from the trimming area and frequently the machine must be stopped and the strips removed manually. This problem has been recognized and one solution offered in United States Letters Patent No. 2,750,608, granted June 19, 1956, to John M. Whelton, wherein there is disclosed a trimming machine having a rotary chopping cutter which severs the inseam substance into small chips which are subjected to the action of an exhaust fan to remove them from the machine. However, the use of a rotary chopping cutter which must be rotated at a high speed causes the chips to be scattered before all of them can be removed by the exhaust fan, whereupon they collect on the shoe and the trimming and feeding instrumentalities, ultimately resulting in inefficient trimming and lowered production.

Accordingly, it is an object of the present invention to provide a trimming machine having an improved organization of cutting and feeding elements arranged to facilitate rapid and automatic removal of material cut from the inseam substance.

It is another object of this invention to provide an inseam trimming machine having a rotary chopping cutter which is arranged to conduct chips of the inseam substance effectively to an exhaust system whereby they will not be scattered or caused to fall upon the shoe being trimmed or upon the operating instrumentalities of the machine.

After the inseam of a welt shoe has been trimmed, a subsequent operation is the attaching of the outsole by securing it to the sole attaching surface of the welt which is contiguous with the trimmed surface of the inseam. The attaching is usually done by a combination of stitching and cementing. It is desirable that the trimmed surface of the inseam be abraded or roughened to provide a surface to which the outsole and cement may firmly adhere. It is obvious that if abrading can be combined in the inseam trimming operation, the outsole will be secured more firmly to the shoe.

It is, therefore, another object of the present invention to provide a machine which will both trim and abrade the inseam of a shoe.

It is still another object of the present invention to provide an inseam trimming machine having a chopping mechanism arranged with respect to shoe feeding instrumentalities to produce a trimmed and roughened inseam surface preparatory to the application thereto of an outsole.

It is a further object of the present invention to provide an inseam trimming machine which is inexpensive to construct and which may be operated with a minimum degree of skill on the part of an operator.

In accordance with these objects and as a feature of the present invention, there is provided an inseam trimming machine having a multi-blade chopping cutter which is rotatable on an axis forming an acute angle with the path of feed of a shoe and with the bottom of a shoe presented to the machine in inverted position, each cutting blade having a cutting edge which produces a cut in the inseam substance at an acute angle with the shoe bottom and a second cutting edge to produce a cut at an angle with the first cut to sever an irregular shaped chip whereby the trimmed surface of the inseam of the shoe is formed with a fine saw tooth pattern.

As another feature of the present invention, there is provided an inseam trimming machine having a multi-blade chopping cutter arranged relative to cooperating shearing instrumentalities and to feeding instrumentalities and provided with a chip confining housing to retain chips effectively within an area wherein they may be effectively removed through an exhaust system. An exhaust conduit or passageway is arranged relative to the chip confining area and to the path of rotation of the chopping blades in such manner that most of the chips leaving the cutting blades under the force of centrifugal motion enter the passageway and thus are removed from the trimming area before they can be scattered or contact other elements of the trimming and feeding mechanisms.

As another feature of the present invention, there is provided easily operated means for separately adjusting the position of the chopping cutter relative to shearing elements and to the feeding instrumentalities, lengthwise of its axis of rotation, lengthwise of the direction of feed and substantially normal to the direction of feed and as still another feature, there is provided inexpensive flexible power transmitting means to rotate certain of the shoe guiding and feeding elements which eliminates the more expensive and elaborate gearing found in former inseam trimmers.

These and other features of the invention and the advantages gained thereby will best be understood from a consideration of the following specification taken in conjunction with the accompanying drawings in which:

Fig. 4 is a detail view, partly in section, of a chopping cutter and its mounting and adjusting mechanism;

Fig. 5 is a detail view, partly in section, of a rib guide and its supporting mechanism;

Fig. 7 is a front elevation partly in section of the trimming mechanism arranged relative to a chip confining and exhausting mechanism with portions removed for clarity;

Fig. 8 is a section through the bottom of a partially fabricated shoe showing the inseam and the cutter as trimming takes place;

Fig. 9 is a section similar to Fig. 8 through the bottom of a shoe but on an enlarged scale showing the finished trimmed surface of an inseam;

Fig. 10 is a view similar to Fig. 9 and showing an inseam having a different pattern on its trimmed surface.

Figure 2:
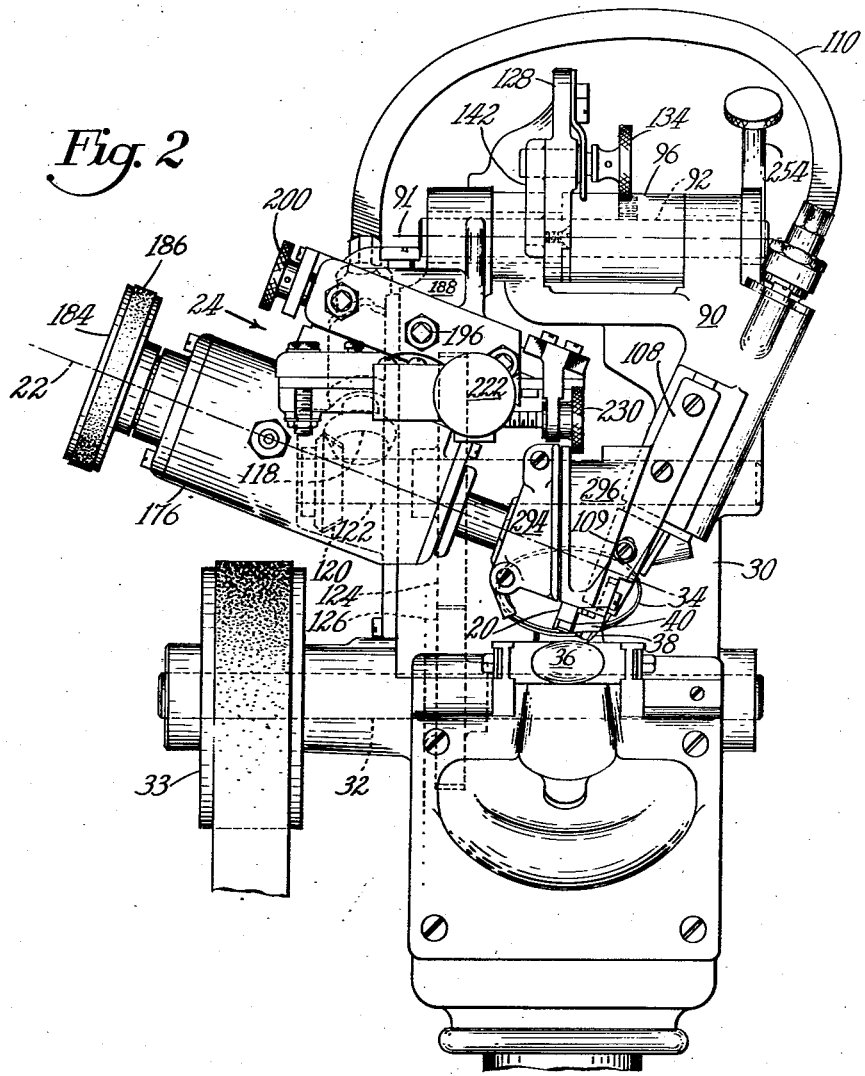
Fig. 2 is a front elevation of the portion of the machine shown in Fig. 1.
Figure 11:
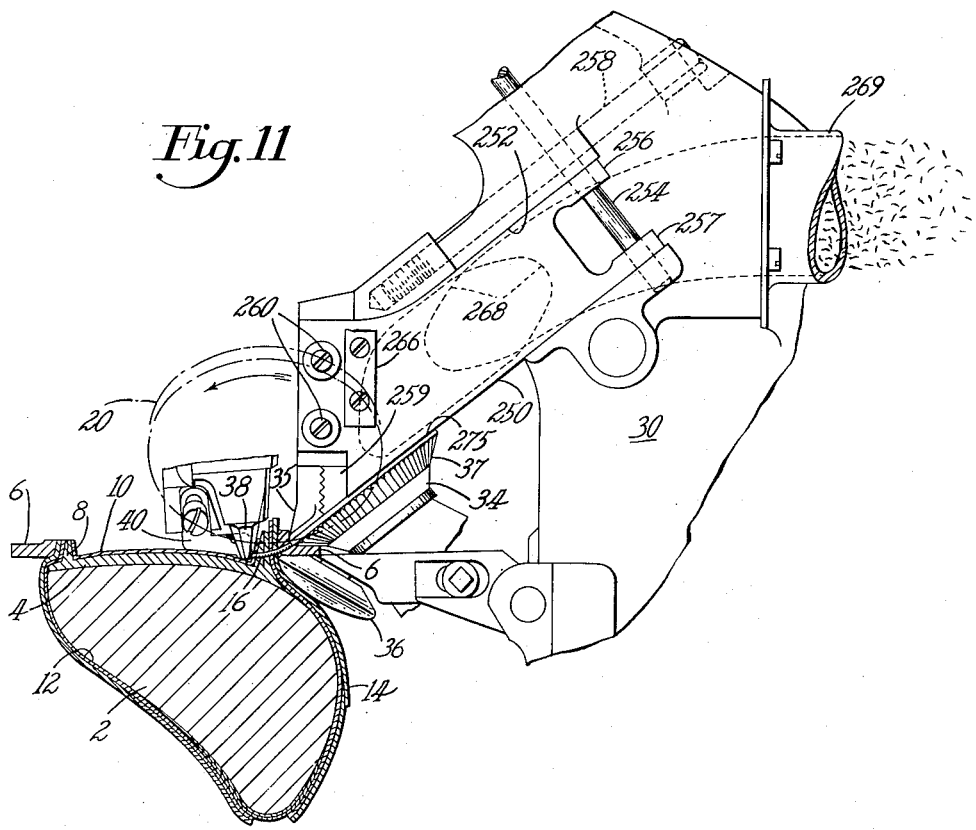
Fig. 11 is a right side elevation of the mechanism shown in Fig. 7 and including a section through a shoe and a last taken at a point slightly heelward of the ball line.

The construction of the inseam of the usual welted is seen best in Figs. 8 and 11. Fig. 8 is a section through the bottom of a partially fabricated shoe on a last as trimming takes place, the inseam extending upwardly away from the insole as the shoe is presented to the machine bottom upward. Fig. 11 shows a section through the shoe and last at right angles to the view in Fig. 8 taken at a point slightly heelward of the ball line. The following elements are included: a last 2, an insole 4, a welt 6, a preformed insole rib 8, a canvas rib reinforcing material 10, a lining 12, upper leather 14, and a line of stitches 16 that form the actual inseam joint. To sever the excess portion of the sewn inseam extending above the stitch line, the shoe being held bottom upward, there is provided a rotary trimming cutter 20 which is of multi-blade construction of the type disclosed in the above-mentioned Whelton patent. The cutter rotates about an axis 22 which is inclined downwardly toward the right-hand or feeding side of the machine as seen in Fig. 2. The cutter is mounted for rotation in the machine and is adjustable in three directions relative thereto by means of an adjustable mounting mechanism 24 hereinafter to be described.

Cooperating with the rotary cutter 20 to feed and trim the shoe are a driven feed wheel 34 which is also a rotary shearing member, a stationary shear block 35, a welt crease guide 36 and a rotating rib guide 38 in addition to a depth gage 40 all mounted adjacent the lower edge or cutting point of the rotary cutter 20. The welt crease guide 36 is shaped and mounted on the machine to enter the crease between the grain side or upper engaging surface of the welt 6 and the upper leather 14 (Fig. 11) to press the welt against the feed wheel 34 and also to restrict lateral movement of the shoe inwardly of the machine. The feed wheel 34 has a knurled conical periphery 37 engageable with the flesh side or outsole attaching surface of the welt opposite the welt crease guide. The rib guide 38 is engageable within the inner surface of the insole rib 8 which is usually reinforced with canvas 10 constituting the inside surface of the inseam. Contacting the bottom of the insole, however, is the depth gage 40. The above-mentioned elements comprising part of the trimming and feeding mechanisms each will be described in more detail hereinafter and their cooperation explained more fully.

The machine has a main frame 30 in which is journaled the main driving shaft 32 which receives its power from any convenient means, as for example, a motor driven belt and pulley 33. The shaft 32 is driven in a counter-clockwise direction when viewed in the direction of feed, as in Fig. 1, which represents the right-hand or feeding side of the machine as seen by the operator.

Figure 3:
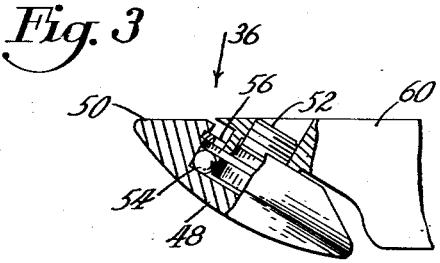
Fig. 3 is a detail view, partly in section, on an enlarged scale, of a welt crease guide employed in the machine.

The feed wheel 34, which is also the rotary shearing member, is mounted on the upper end of a shaft 42 journaled for rotation in the main frame 30. A gear 44 is fixed to the lower end of the shaft 42 and meshes with a gear 46 on the main driving shaft 32. The welt crease guide 36, best seen in Fig. 3, comprises a one-piece idler wheel 48 having a quarter round edge 50 and is mounted for rotation on a threaded stud 52 by means of ball bearings 54. The wheel 48, bearings 54 and stud 52 are held in assembled relation by means of a spring washer 56. The stud 52 is threaded in the forward end of a lever 60 (Fig. 1) which is pivoted in the machine frame on a stud 62. The welt crease guide is biased upwardly toward the feed wheel 34 to grip the welt by means of a compression spring 66 which bears upon the rearward end of the lever 60. To release the welt crease guide 36 from its gripping position and in order to insert a shoe, the operator depresses a treadle 68 which is connected to a treadle rod 70 extending vertically through the frame of the machine. An adjustable force transmitting lever 72 is mounted for pivotal movement about a stud 74 at the rear of the machine and when a collar 76 secured to the treadle rod 70 bears downwardly upon the inner end of the lever 72 its outer or rearward end moves upwardly. A force delivering member 78 mounted on the lever 72 bears upwardly against the lever 60 to cause the welt crease guide 36 to be pivoted away from the feed wheel each time the treadle is depressed. The position of the member 78, which is adjustable vertically on the lever 72 by means of a screw and slot connection 80, determines the extent of downward movement of the welt crease guide 36 when the treadle is depressed. The space between the welt crease guide 36 and the feed wheel 34 is initially adjusted to an amount, just less than the thickness of the welt to be trimmed, by means of an adjusting screw 82 threaded in the force transmitting lever 72 and which bears against the machine frame 30. The more the screw is advanced toward the machine frame the greater the space becomes between the welt crease guide 36 and the feed wheel 34.

Figure 1:
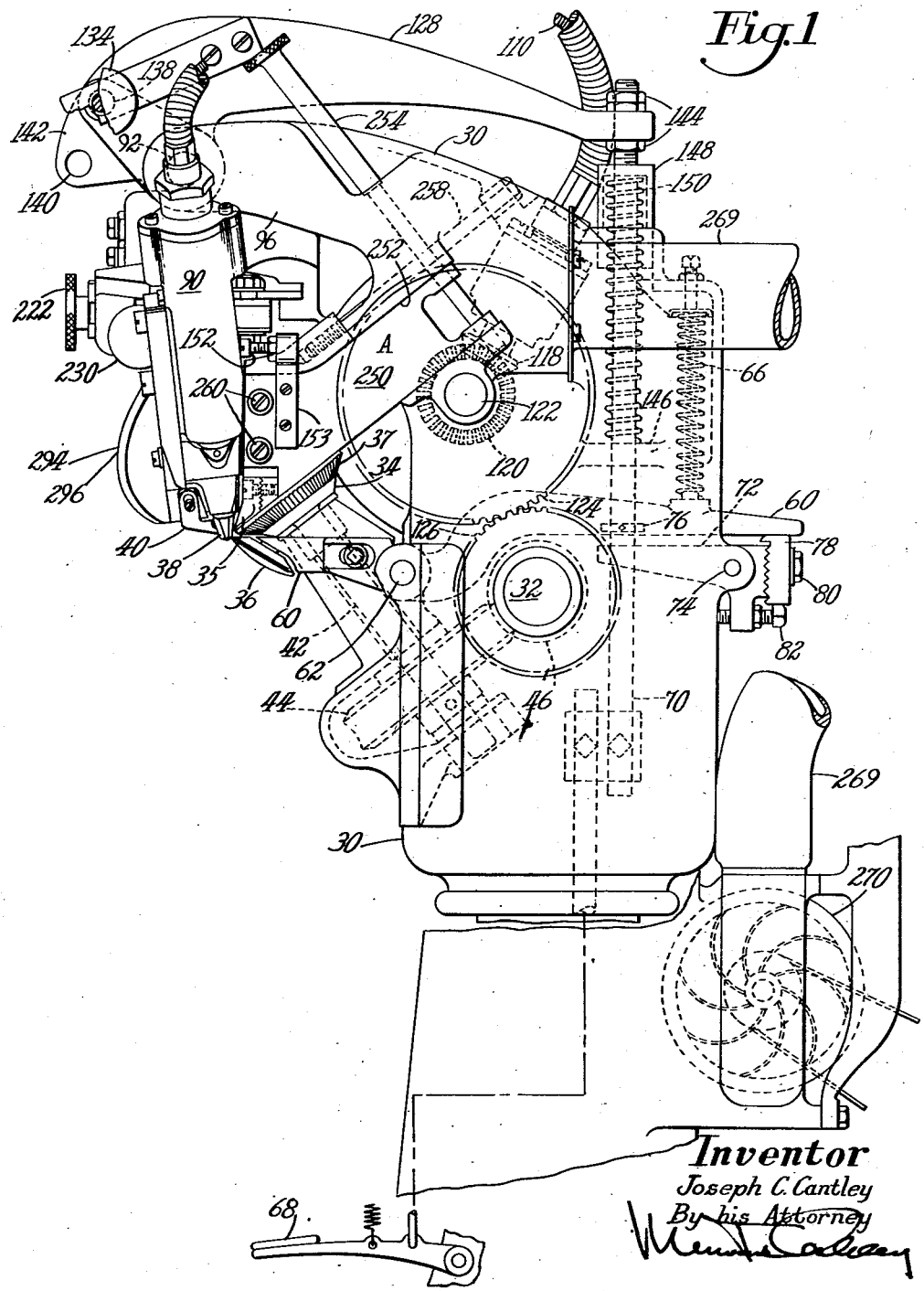
Fig. 1 is a side elevation on a reduced scale of the head of an inseam trimming machine embodying the principles of the present invention.

The rib guide 38 and its novel supporting mechanism will now be described. The rib guide is herein described as an inverted frustum of an hexagonal pyramid, although it may be of other conventional design, and is mounted in advance of the cutter 20 at the bottom of a pivotal bracket 90. At its upper end the bracket 90 is mounted for rotation about a horizontal axis 91, being supported on the ends of a shaft 92 which is fixed by means of a set screw 94 in a forwardly projecting portion 96 of the machine frame. The shaft 92 and thus the axis 91 is located a slight distance to the left of a vertical line passing through the cutting point which is the intersection of the members 35, 36 and 38 (Fig. 1). The rib guide is mounted at the lower end of the bracket 90 in an extension 98 of the bracket and is mounted on the lower end of a shaft 100 (Fig. 5) which carries a gear 102 on the end opposite the rib guide. Meshing with the gear 102 is a gear 104 secured to the lower end of a shaft 106 which is journaled in the bracket 90. The axes of the shafts 104 and 106 are parallel and form substantially right angles with the axis of rotation 22 of the cutter. In order to adjust the rib guide 38 heightwise, the extension 98 is movable toward and away from the main part of the bracket 90 along a slide 108, being adjustably secured thereto by means of a slot and screw connection 109 and is similar to that of the prior machines.

The shaft 106 and, hence the rib guide, derives its rotary motion from a flexible cable 110 the sheath of which is secured to the bracket 90 by means of a threaded cap 112, Fig. 5. The flexible cable is of conventional design having a tang 114 slidably engaged within a rectangular opening 116 in the shaft 106. The flexible shaft derives its power from the main drive shaft 32 being connected thereto by means of gears 118 and 120 (Figs. 1 and 2), a rotary shaft 122 and gears 124 and 126. A flexible drive shaft to rotate the rib guide is not only more economical than the gear driven mechanism of the prior machines but also permits the bracket 90 to be of simpler construction providing more useable space within the machine frame, particularly in the upper part of the machine. The advantages of this latter feature will become more apparent hereinafter.

As in the prior machines, the pivotal motion of the bracket 90 is controlled by a lever arm 128 which is free to pivot about the axis 91 of the shaft 92. The lever arm 128 is secured by means of screws 130, only one of which is seen in Fig. 5, to a collar 132 rotatable on the shaft 92. Mounted on the forward portion of the lever 128 is a spring-biased detent 134 of known construction, the tip 136 of which may enter one of a pair of holes 138, 140 in a plate 142 which is securely fixed to the bracket 90. At its rearward end the lever 128 is attached to the treadle rod 70 by means of lock nuts 144. The bracket 90 may be held by the lever 128 in one of two positions, a lower or operating position when the detent 134 is in the hole 138 and an upper or inoperative position when the detent is in the hole 140 and the bracket 90 elevated, the latter position providing access to the feeding and trimming instrumentalities. This mechanism is similar to that disclosed in the above-mentioned Eppler patent.

Surrounding the upper end of the treadle rod 70 and confined between a stationary strut 146 in the frame and a tubular thrust member 148 which is threadedly attached to the treadle rod is a compression spring 150. When the treadle 68 is depressed the lever arm 128, and hence the rib guide bracket 90, is rotated clockwise about the shaft 92 as seen in Fig. 1 and when the treadle is released, the spring 150 causes the lever arm 128 to pivot counterclockwise. This moves the rib guide 38 inward and upward to a position adjacent the feel wheel 34. To adjust the operating position of the rib guide 38 relative to the feed wheel 34, the rearward end of the lever 128 is adjusted heightwise of the treadle rod 70 by means of the lock nuts 144. The innermost position of the rib guide is limited by means of an adjustable stop screw 152 threaded in a bracket 153 on a portion of the machine frame and engageable by a rearward portion of the bracket 90.

Because the shaft 92 is not directly above the rib guide 38 when the latter is in its operating position, but rather slightly to the left, as seen in Fig. 1, the rib guide 38 moves in a curved path, downwardly to the left and upwardly to the right in a manner similar to that disclosed in United States Patent 2,729,838 to Baker. It will also be noted that the welt crease guide 36 does not pivot downwardly away from the feed wheel 34 until the collar 76 comes in contact with the lever 72. This lost motion is to permit the rib guide 38 to move away from the feed wheel during trimming due to variations in inseam thickness without the welt crease guide 36 loosening its grip on the welt of the shoe as also explained in the above-mentioned Baker patent.

Figure 6:
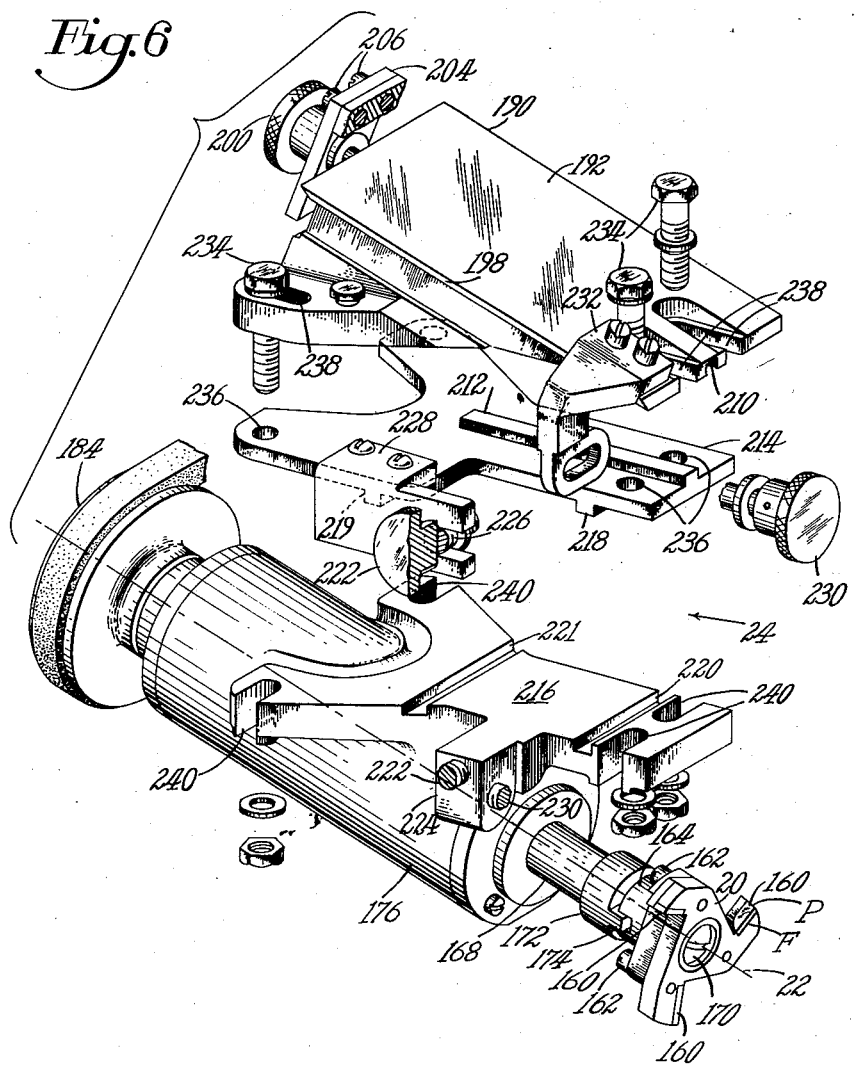
Fig. 6 is an exploded view, partly in section, of the cutter and its mounting and adjusting mechanism shown in Fig. 4.

The trimming cutter 20 and its adjustable mounting 24 are best seen in Figs. 4 and 6. The cutter comprises a multi-blade cutting disk, each blade having a hardened cutting member 160 of tungsten carbide or similar material. In many of its respects the cutter is similar to that disclosed in the above-mentioned Whelton patent and will be described in more detail hereinafter. The cutter is secured by means of a plurality of screws 162 to a hub 164. The assembled cutter and hub fit over a tapered end 166 of a spindle 168 and are held thereon by a screw 170. Adjacent the tapered end 166 is a second hub member 172 keyed to the spindle and having a pair of projecting lugs 174, only one of which is seen in Fig. 4, in sliding engagement with recesses in the hub 164 to impart rotary motion to the cutter. The spindle 168 is journaled for rotation within a housing 176 in preloaded bearings 178, 179. The spindle and bearings are held within the housing 176 by means of caps 180 and 182 screwed to the opposite ends of the housing. Rotary motion is imparted to the spindle 168 by means of a pulley 184 and a flexible belt 186 which derives its power from a motor or other suitable means not shown.

The spindle housing 176, and consequently the cutter, is adjustably mounted on the machine frame 30 by mechanism now to be described. A forwardly projecting portion 188 (Fig. 4) of the machine frame is constructed to receive for adjustable movement a slide 190. The slide, in the form of a wedge, has a flat upper surface 192, best seen in Fig. 6, which is parallel to the axis 22 of the spindle and cutter. The slide 190 is held in position by means of a pair of gibs 194, only one of which is seen in Fig. 4, mounted one on each side of the slide in the forwardly projecting portion 188 of the frame by means of screws 196. The gibs fit against undercut beveled surfaces 198 formed one on each side of the slide 190. The slide is movable lengthwise along the gibs in a path parallel to the axis 22 by an adjusting screw 200. The screw is threaded in the slide and has a necked portion 202 fitting within a slotted plate 204 secured by screws 206 to the forwardly projecting portion 188 of the frame. A lock screw 208 threaded in the projecting portion of the frame bears against the upper surface 192 of the slide to secure the slide in the desired position of adjustment.

The bottom of the slide 190 is horizontal and has formed therein a longitudinal slot 210 which mates with a key 212 formed on the upper horizontal surface of a plate 214. The lower surface of the plate 214 is also horizontal and engages an upper horizontal surface 216 formed on the spindle housing 176. A pair of keys 218, 219 formed at right angles to the key 212 are fixed to the lower surface of the plate 214 and fit within mating slots 220, 221 formed in the surface 216 of the spindle housing to restrict relative movement between the spindle housing and the plate 214 to a path transversely of the key 212. An adjusting screw 222 is threaded in a boss 224 formed on the spindle housing and has a necked portion 226 rotatable in a slotted bracket 228 secured to the plate 214. A similar adjusting screw 230 is threaded in the boss 224 at right angles to the screw 222 and is rotatable in a slotted bracket 232 secured to the slide 190. Holding the slide 190, the plate 214 and the spindle housing 176 together as a unit are a plurality of bolts 234. The bolts pass through bores 236 in the plate 214 but are received in slots 238 and 240 in the slide 190 and the spindle housing 176, respectively. The slots 238 extend parallel to the key 212 and the slots 240 extend at right angles thereto and parallel to the keys 218, 219. Accordingly, when the bolts 234 are loosened, the spindle housing 176 and thus the cutter 20 may be adjusted inwardly and outwardly of the machine transversely of the direction of feed by rotating the adjusting screw 222 which causes the housing 176 to move relative to the plate 214 and to the slide 190 in the direction of the slots 220, 221. Likewise, the spindle housing and cutter may be moved horizontally widthwise of the machine which is parallel to the direction of feed by rotating the adjusting screw 230 which causes the housing and plate 214 to move relative to the slide 190 along the keyed slot 210 and thirdly, the housing and cutter may be moved along the axis of rotation 22 by rotating the adjusting screw 200 which moves the slide, the plate and the housing relative to the machine frame. After the desired adjustments have been made the bolts 234 are tightened.

The feeding and trimming instrumentalities are so constructed and arranged relative to each other and to a chip confining housing as to effectively chop the excess portions of the inseam into chips and direct them to an exhaust conduit which may be connected to a factory dust removal system or to an individual receptacle. Forming one part of the chip confining housing is a block 250 which is removably secured in a right-hand portion of the machine frame. The block 250 is of irregular configuration and will best be seen in Figs. 7 and 11. The upper portion of the block fits snugly within an opening 252 in the frame and is secured therein by means of a removable stud 254 passing through the frame and entering a pair of apertured ears 256, 257 formed on the block 250 and by a clamping screw 258 threaded into the block. In effect, the outside of the block 250 constitutes a part of the outer wall of the machine frame in the area designated A in Fig. 1. At the lower end of the block 250 adjacent the trimming and feeding instrumentalities is located a member 259 for supporting the stationary shear block 35. The member 259 is secured to the block 250 by means of slot and screw connections 260 and is adjustable heightwise thereof, assisted by meshing serrations 262 (Fig. 7) on their contacting surfaces. The stationary shear member 35 is located on the lower end of the member 259 and is adjustable in a horizontal direction toward and away from the cutter 20 by means of a slot and screw connection 264. The mating surfaces of the members 35 and 259 also have intermeshing serrations. Carried on the block 250 is the above-mentioned bracket 153 into which is threaded the adjustable stop screw 152 for limiting the inward movement of the rib guide bracket 90. The mid portion of the block 250 is hollow, providing a passageway 268, indicated by the dotted lines in Figs. 7 and 11. This passageway 268 leads to a chip removal conduit 269 connected to an exhaust fan 270 (Fig. 1) or to a factory dust removal system. It will be noted in Fig. 7 that the mouth of the passageway 268 in the block 250 is offset both vertically and horizontally from the bottom or cutting point of the cutter 20 but occupies a position substantially in a plane 271 defined by the inclined face of the cutter. The passageway is so located to facilitate the efficient removal of chips which fly centrifugally from the cutter blade.

Forming another portion of the chip confining housing is a member 272, secured to the machine frame by screws 273 and best seen in Fig. 7. The member 272 likewise is of irregular construction, having a lower arcuate portion 274 spaced slightly above the upper peripheral surface 275 of the rotary shear member or feed wheel 34, a wall portion 276 through which the spindle 168 of the cutter passes, and a flat front surface 278 lying substantially in a vertical plane. Fitting against the surface 278 of the member 272 and secured thereto by screws 292 is a cap 294, best seen in Figs. 1 and 2, which forms part of the front wall of the chip confining housing, as viewed by the operator. Fitting in close proximity to the cap 294 is a second cap 296 which is also of irregular curved configuration and is fixed to the rib guide supporting bracket 90 so that when the bracket 90 is pivoted upward in a clockwise direction, as seen in Fig. 1, the operator may have ready access to the trimming instrumentalities, etc. Forming the bottom portion of the chip confining housing is the upper cup-shaped surface 297 of the feed wheel or rotary shear member 34. Thus it will be seen that the trimming cutter rotates within a substantially confined area defined by the lower portion of the block 250, the member 259, the member 272, the cap members 294, 296 and the upper surface of the feed wheel 34. The chip confining housing is not airtight and is so constructed in order to permit the flow of air therethrough to facilitate the removal of chips through the passageway 268 and the conduit 269. The housing may be provided with additional air holes for this purpose.

Each time one of the cutter blades contacts the inseam at the lower portion of its path of rotation it presses the inseam against the shearing edge 275 of the rotary shear member 34 and a shearing edge formed on a hardened insert 298 fixed in the stationary shear member 35, whereupon a chip is severed and directed upwardly to the right, as seen in both Figs. 7 and 11. The path of movement of the chip is substantially tangent to the path of rotation of the cutter at its lowest point. Thus the chip is directed toward the passageway 268 through which it moves to the exhaust conduit 269. Were the passageway not so located relative to the cutter, chips would not be as readily exhausted and could be caused to move in a circular path by the rapidly moving cutter blades, some of the chips eventually accumulating within the confining housing rather passing rapidly therefrom.

The cooperation of the feeding and trimming instrumentalities of the machine while operating on a shoe will best be seen in Figs. 7 to 11. The cutter 20, each of its cutting blades being formed with a hardened insert 160, is initially adjusted along its axis 22 until the peripheral edges P of the blade inserts just clear the upper peripheral surface or shearing edge 275 of the rotary shear member or feed wheel 34. The stationary shear block 35 is adjusted until a hardened insert 298 of tungsten carbide or the like which is fixed in the block is within a few thousandths of an inch from the face surface F of the cutter blades. After the other above-mentioned adjustments are made, the machine is treadled in the usual manner to pivot the welt crease guide 36 and the rib guide 38 away from the feed wheel 34 in order to insert a shoe. Upon releasing the treadle, the feed wheel, and the rib guide and the crease guide grip the welt and inseam and the shoe is fed to the left bottom upward in substantially a horizontal path as seen in Figs. 8 and 10 against the rotating cutter. The fact that the rib guide 38 is rotated on an axis which is inclined downwardly and to the right as seen in Fig. 1 and downwardly and to the left as seen in Fig. 2, permits it to impart an upward component of forces to the inseam to hold the inseam erect during trimming as described in the above-mentioned Baker patent. The depth gage 40 contacts the bottom of the shoe and guides it during trimming. As the shoe is fed to the left under the cooperative action of the lower serrated surface of the feed wheel 34, the crease guide 36 and the rib guide 38, the face surface F of each of the cutter blades cooperates with the hardened insert 298 of the shear block 35 and produces a substantially downwardly extending cut in the excess portion of the inseam above the stitch line 16 forming substantially an acute angle with the shoe bottom and the peripheral surface P, cooperating with the shearing edge 275 of the feed wheel 34, produces a second cut severing at each stroke a chip which is directed toward and rearwardly through the passage 268 and the conduit 269.

The fact that the axis of rotation 22 of the cutter is inclined downwardly and to the right, as seen in Figs. 7 and 8, not only aids in the removal of chips but also makes it possible to obtain a fine saw tooth pattern on the upper surface of the trimmed inseam, as seen in Fig. 9, which eliminates the necessity of roughing or abrading prior to attaching an outsole. The size of the saw tooth pattern may be controlled by varying the ratio of speed of rotation of the cutter to the speed of linear feed of the shoe. Since the blades of the cutter come close to but never touch the shearing edge 275 of the feed wheel the peripheral edges P of the cutter blades may be ground at right angles to their face surfaces F, as seen in Figs. 7 and 8, resulting in the saw tooth pattern of Fig. 9. However, in order to obtain a greater spacing between the individual ridges or saw teeth on the inseam without varying the ratio of speeds, the peripheral surface of the cutter blades may be ground to form a partial angle P', in the manner shown in Fig. 10, whereby the ridges will be spaced from each other a greater amount.

Having thus described my invention, what I claim as new and desire to secure by Letters Patent of the United States is:

1. An inseam trimming machine having, in combination, trimming means, feeding means located adjacent said trimming means and comprising a driven feed wheel engageable with one side of the outlying margin of the welt of a partially fabricated welt shoe and presser means engageable with the other side of the welt whereby the feed wheel and presser means grip the welt between them and feed the shoe to said trimming means, said trimming means comprising a chopping cutter rotatable on an axis forming an acute angle with the direction of feed, and means for separately adjusting the position of said cutter lengthwise of the axis of rotation, lengthwise of the direction of feed and substantially normal to the direction of feed.

2. An inseam trimming machine having, in combination, trimming means, feeding means located adjacent said trimming means and comprising a rotatable welt crease guide constructed and arranged to enter the crease between the upper and the welt of a partially fabricated welt shoe, a driven rotatable feed wheel engageable with the outlying margin of the welt on the side opposite the welt crease guide, means to press the welt crease guide toward the feed wheel whereby the welt is gripped between the feed wheel and the welt crease guide to feed the shoe and the trimming means, said trimming means comprising a chopping cutter rotatable on an axis forming an acuate angle with the direction of feed, a rotatable rib guide engageable with the inner surface of the inseam opposite the welt, and means to rotate the rib guide on an axis substantially normal to the axis of rotation of said cutter.

3. A machine for trimming the inseam of a partially fabricated welt shoe with the bottom facing upwardly having, in combination, means for trimming excess portions of the inseam, feeding means located adjacent said trimming means and comprising a driven feed wheel engageable with one side of the outlying margin of the welt and means engageable with the other side of the welt for pressing it against the feed wheel whereby the feed wheel and the presser means grip the welt between them to feed the shoe to the trimming means, a rotatable rib guide engageable with the inner surface of the inseam on the side opposite the welt and means to rotate said rib guide on an axis inclined downwardly toward the trimming means, said axis forming an acute angle with the bottom of the shoe, said trimming means comprising a chopping cutter rotatable on an axis forming an acute angle with the bottom of the shoe, the axis of said cutter being substantially normal to the axis of said rib guide.

4. An inseam trimming machine, having in combination, trimming means, feeding means located adjacent said trimming means and comprising a rotatable rib guide engageable with the inner surface of the inseam of a partially fabricated welt shoe, a driven feed wheel engageable with one side of the outlying margin of the welt and presser means engageable with the other side of the welt whereby the inseam and the welt are gripped to feed the shoe to the trimming means, said trimming means comprising a chopping cutter rotatable on an axis forming an acute angle with the direction of feed and having a plurality of angularly disposed cutting surfaces to sever excess portions of the inseam into chips, and a chip confining housing substantially enclosing said trimming and feeding means.

5. An inseam trimming machine having, in combination, trimming means, feeding means located adjacent said trimming means and comprising a rotatable rib guide engageable with the inner surface of the inseam of a partially fabricated welt shoe, a driven feed wheel engageable with one side of the outlying margin of the welt and presser means engageable with the other side of the welt whereby the inseam and the welt are gripped to feed the shoe to the trimming means, said trimming means comprising a chopping cutter rotatable on an axis forming an acute angle with the direction of feed and having a plurality of angularly disposed cutting surfaces to sever excess portions of the inseam into chips, a chip confining housing substantially enclosing said trimming and feeding means, and a chip removal passageway connected to said housing at a point above the lowest point of said cutter and displaced therefrom in a direction opposite to the direction of feed.

6. An inseam trimming machine having, in combination, trimming means, feeding means located adjacent said trimming means and comprising a rotatable rib guide engageable with the inner surface of the inseam of a partially fabricated welt shoe, a driven feed wheel engageable with one side of the outlying margin of the welt and presser means engageable with the other side of the welt whereby the inseam and the welt are gripped to feed the shoe to the trimming means, said trimming means comprising a chopping cutter rotatable on an axis forming an acute angle with the direction of feed and having a plurality of chopping blades constructed and arranged to move widthwise of the inseam substance to sever excess portions of said inseam into chips, a chip removal passageway adjacent said cutter and intersecting a plane defined by the path of rotation of said chopping blades.

7. An inseam trimming machine having, in combination, trimming means, feeding means located adjacent said trimming means and comprising a rotatable rib guide engageable with the inner surface of the inseam of a partially fabricated welt shoe, a driven feed wheel engageable with one side of the outlying margin of the welt and presser means engageable with the other side of the welt whereby the inseam and the welt are gripped to feed the shoe to the trimming means, said trimming means comprising a chopping cutter rotatable on an axis forming an acute angle with the direction of feed and having a plurality of chopping blades constructed and arranged to move widthwise of the inseam substance to sever excess portions of said inseam into chips, a chip confining housing substantially enclosing the trimming and feeding means, and a chip removal passageway connected to said housing and intersecting a plane defined by the path of rotation of said chopping blades.

References Cited in the file of this patent

UNITED STATES PATENTS

| | | |
|---|---|---|
| 2,030,057 | Eppler | Feb. 11, 1936 |
| 2,476,290 | Fossa | July 19, 1949 |
| 2,750,608 | Whelton | June 19, 1956 |

FOREIGN PATENTS

| | | |
|---|---|---|
| 537,481 | Great Britain | June 24, 1941 |